(No Model.)

D. M. MARQUIS.
SLIDING JOINT FOR GAS MAINS.

No. 381,803. Patented Apr. 24, 1888.

Witnesses.
V. M. Hood.
A. M. Hood.

Inventor.
Daniel M. Marquis.
By
H. P. Hood.
Attorney.

UNITED STATES PATENT OFFICE.

DANIEL M. MARQUIS, OF KOKOMO, INDIANA.

SLIDING JOINT FOR GAS-MAINS.

SPECIFICATION forming part of Letters Patent No. 381,803, dated April 24, 1888.

Application filed February 13, 1888. Serial No. 263,799. (No model.)

*To all whom it may concern:*

Be it known that I, DANIEL M. MARQUIS, a citizen of the United States, residing at Kokomo, in the county of Howard and State of Indiana, have invented a new and useful Improvement in Sliding Joints for Gas-Mains, of which the following is a specification.

My invention relates to an improved sliding joint for gas-mains.

The object of my improvement is to provide a a sliding joint which may be cheaply made, and which is adapted for use with large wrought-iron pipes, such as are used for conducting natural gas.

The accompanying drawings illustrate my invention.

Figure 3:
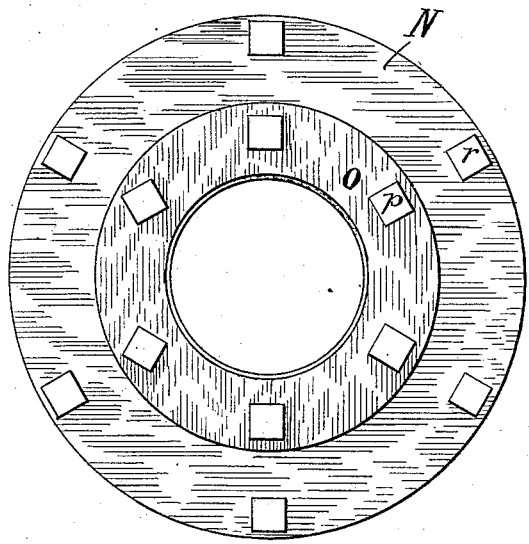
Figure 2:
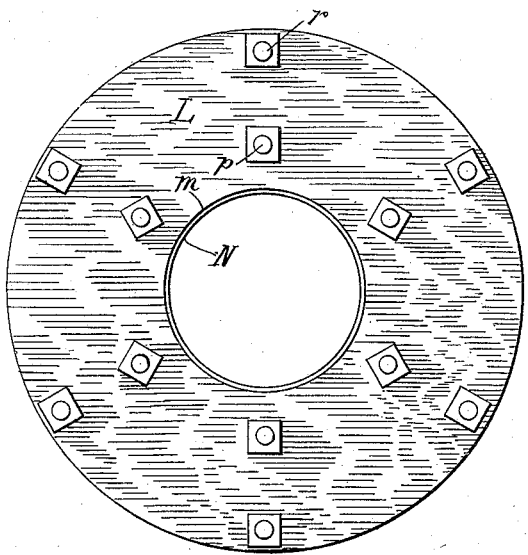
Figure 1:
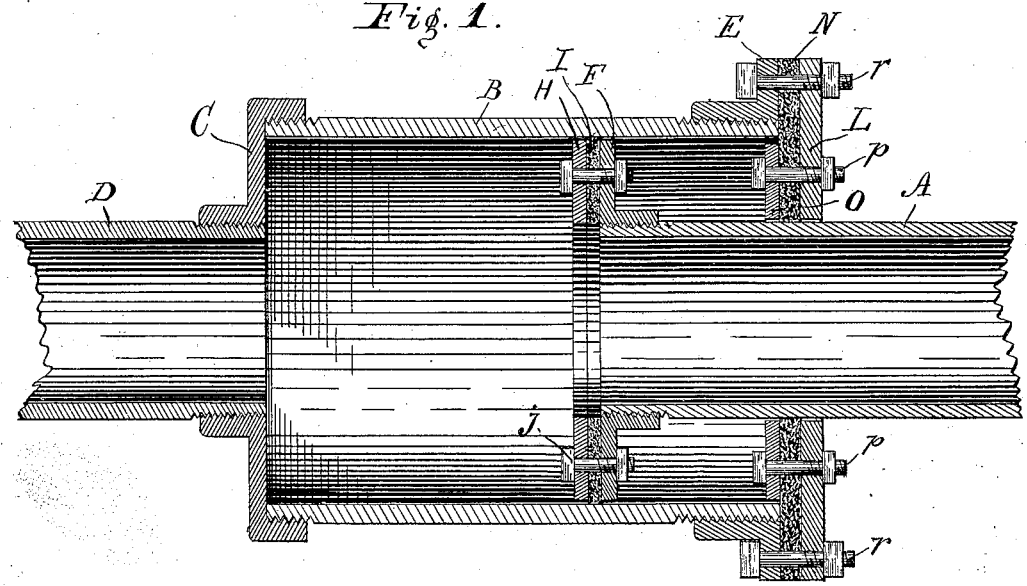

Figure 1 represents a central longitudinal section. Fig. 2 represents the outer side of the removable head. Fig. 3 represents the inner side of the same.

A is a short section of pipe of the same diameter as the pipe on which the joint is to be used.

B is a short section of pipe of larger diameter than pipe A. Both ends of pipe B are screw-threaded.

C is a cast-iron reducing head adapted to be screwed upon and to close one end of pipe B and to receive the screw-threaded end of the line-pipe D.

E is a cast-iron flange screwed upon the open end of pipe B.

F is a cast-iron flange, screw-threaded to receive one end of pipe A, and of a little less exterior diameter than the interior of pipe-section B.

H is an annular plate of the same diameter as flange F.

I is an annular gasket of rubber or like elastic packing material. Gasket I is a little larger in exterior diameter than flange F and plate H, and is clamped between them by bolts *j*, thus forming on the end of the pipe A a piston which fits and is adapted to slide along the interior of pipe-section B.

L is a circular plate of the same diameter as flange E. Plate L has a central hole, *m*, through which pipe A passes easily.

N is a gasket, of rubber or like elastic packing material, of the same size as plate L and fitting pipe B closely.

O is an annular plate having the same interior diameter as the opening in plate L, and less outside than the inside of pipe B.

The inner edge of gasket N is clamped by bolts *p* between plates L and O, and thus forms a packing around pipe B, and the outer edge of the gasket is clamped by bolts *r* between plate L and flange E, and thus forms a packing for that joint also. The outer end of pipe B is screw-threaded to receive an ordinary pipe-coupling. By this construction a cheap and reliable sliding joint is formed principally from ordinary pipe and with ordinary pipe-fitting appliances.

I claim as my invention—

1. In a sliding joint for pipes, the combination, with pipe-section B, having flange E, and pipe-section A, of the removable head consisting of plates L and O and gasket N and bolts *p* and *r*, all arranged substantially as and for the purpose specified.

2. In a sliding joint for pipes, pipe-section B, having reducing-head C and flange E screwed thereon, plates L and O, gasket N, bolts *p* and *r*, pipe-section A, having flange F screwed thereon, annular plate H, gasket I, and bolts *j*, all combined and arranged to co-operate substantially as and for the purpose specified.

DANIEL M. MARQUIS.

Witnesses:
JOHN N. LOOP,
JOHN E. MOORE.